(12) United States Patent
Yokota et al.

(10) Patent No.: US 8,526,173 B2
(45) Date of Patent: Sep. 3, 2013

(54) ON-VEHICLE DISPLAY DEVICE

(75) Inventors: Hiroyuki Yokota, Shizuoka (JP);
Takahiro Ohsawa, Shizuoka (JP);
Junichi Konagai, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 329 days.

(21) Appl. No.: 12/737,245

(22) PCT Filed: May 18, 2009

(86) PCT No.: PCT/JP2009/059466
§ 371 (c)(1),
(2), (4) Date: Dec. 22, 2010

(87) PCT Pub. No.: WO2010/004812
PCT Pub. Date: Jan. 14, 2010

(65) Prior Publication Data
US 2011/0188192 A1 Aug. 4, 2011

(30) Foreign Application Priority Data

Jul. 11, 2008 (JP) ................. 2008-181271

(51) Int. Cl.
*H05K 7/00* (2006.01)
(52) U.S. Cl.
USPC .................................. 361/679.21

(58) Field of Classification Search
USPC .............. 361/57, 679.21; 340/438–439, 441, 340/449, 455, 461
See application file for complete search history.

(56) References Cited

U.S. PATENT DOCUMENTS

| 2001/0016432 A1 | 8/2001 | Yamauchi et al. |
| 2006/0092098 A1 | 5/2006 | Yokota et al. |

FOREIGN PATENT DOCUMENTS

| JP | 11-204973 A | 7/1999 |
| JP | 2006-132951 A | 5/2006 |

OTHER PUBLICATIONS

International Search Report and Written Opinion of the International Searching Authority dated Jun. 16, 2009, issued for PCT/JP2009/059466.

*Primary Examiner* — Jeremy Norris
*Assistant Examiner* — Tremesha S Willis
(74) *Attorney, Agent, or Firm* — Edwards Wildman Palmer LLP; James E. Armstrong, IV; George N. Chaclas

(57) ABSTRACT

An on-vehicle display device includes: an image display unit 6; wiring boards 8, 9 mounting a control circuit for controlling the image display unit 6; a magnesium alloy case 7 of which front recess receives the image display unit 6, and of which rear recess receives the wiring boards 8, 9; and a shield member 10 attached to the magnesium alloy case 7 for covering the rear recess. The magnesium alloy case 7 is thermally coupled to the image display unit 6 and works as a heat radiating device. The magnesium alloy case 7 is electrically coupled to the shield member 10 and works as an electromagnetic shield device together with the shield member 10.

4 Claims, 6 Drawing Sheets

ON-VEHICLE DISPLAY DEVICE

TECHNICAL FIELD

This invention relates to an on-vehicle display device using an image display unit.

BACKGROUND

In these years, an on-vehicle, display device using an image display for graphically displaying a dial plate, a pointer and the like of a conventional analog meter with such as a TFT (Thin Film Transistor) type LCD (Liquid Crystal Display) has been proposed. Such an on-vehicle display device is called a full graphic meter (For example, see Patent Document 1).

An illumination device composed of LEDs (Light Emitting Diode) disposed on both side edges opposite to each other of a light guide plate of the LCD is mounted on such an on-vehicle display device. In the illumination device, light incoming to the side edges from the LEDs is outputted to the LCD from a surface of the light guide plate as a backlight source. Because the LEDs generate substantial heat, a heat radiating device is mounted on the on-vehicle display device.

FIG. 4 is an exploded perspective view showing an example of an on-vehicle display device having a conventional heat radiating device. In FIG. 4, the on-vehicle display device 31 includes: a front glass 32; a sun shade 33; a display panel 34; a warning unit 35, an LCD display unit 36; a case 37; a first shield case 38; a wiring board assembly having a first part 39 and a second part 40; a second shield case 41; and an attaching bracket 42 to 45.

As shown in FIG. 5, the LCD display unit 36 includes: an upper shield case 361; a TFT-LCD cell 362; an upper case 363; a first prism sheet 364; a second prism sheet 365; a third prism sheet 366; a light diffusing sheet 367; a light guiding panel 368; a reflecting sheet 369; a middle shield panel 370; a spring 371; a lower case 372; an LED substrate 373; a heat radiating panel 374, 375; a controlling panel 376; a lower shield case 377; and heat conducting sheets 378, 379.

The first prism sheet 364, the second prism sheet 365, the third prism sheet 366, the light diffusing sheet 367, the light guiding panel 368, and the reflecting sheet 369 are sequentially overlapped with each other, and received in between the upper case 363 and the lower case 372 to configure an optical structure. For example, DBEF (Dual Brightness Enhancement Film) sheet produced by Sumitomo 3M Co. is used as the first prism sheet 364, and BEF sheet is used as the second prism sheet 365 and the third prism sheet 366. Further, a metallic middle shield panel 370 is inserted into between the reflecting sheet 369 and the lower case 372.

The TFT-LCD cell 362, the optical structure, and the controlling panel 376 are sequentially overlapped with each other, and received in between the metallic upper shield case 361 and the metallic lower shield case 377 to configure a box-shaped TFT-LCD display unit.

A size of the LED substrate 373 corresponds to a side edge of the light guiding panel 368. The LED substrate 373 is a rectangular metallic substrate made of such as aluminum, and LED circuits are formed on an insulator deposited on the metallic substrate. A plurality of LEDs 373a are so assembled as to face the side edge of the light guiding panel 368.

Each of the heat radiating panel 374 with the heat conducting sheet 378, and the heat radiating panel 375 with the heat conducting sheet 379 composes a heat radiating device. The heat radiating panels 374, 375 made of aluminum respectively include: rectangular attaching parts 374a, 375a for attaching to the LED substrates 373; L-shaped parts 374b, 375b integrally formed with the attaching parts 374a, 375a; and a plurality of heat radiating fins 374c and 375c.

The LED substrates 373 are fixed to the heat radiating panels 374, 375 via the heat conducting sheets 378, 379 with screws 382. The heat radiating panels 374, 375 having the LED substrates 373 are fixed to the lower case 372 with screws 380, 381. The heat radiating fins 374c, 375c are extended backward from a same plane as a rear wall of the lower shield case 377 in a length a little longer than a thickness of the LCD display unit, and parallel to a vertical direction. Further, the heat radiating fins 374c, 375c are extended shorter in the vertical direction as the fins are further away from the attaching parts 374a, 375a.

The lower shield case 377 together with the upper shield case 361 and the middle shield plate 370 works as an electromagnetic shield. Further, the lower shield case 377 contacts the heat radiating panels 374, 375 fixed to the lower case 372 to work as a heat radiating member and to increase a heat radiating effect of the on-vehicle display device.

[Patent Document 1] Japanese Published Patent Application No. 2006-132951

DISCLOSURE OF THE INVENTION

Problem to be Solved by the Invention

As shown in FIG. 6, for attaining enough strength to hold weight of a heat radiating device of a backlight of the TFT-LCD cell 362, noise tolerability against noise generated by rapidly operating the TFT-LCD cell 362, and dust resistance, casing parts of the above-described on-vehicle display device includes: a resin-made case 37; a warning unit 35; aluminum-made heat radiating panels 374, 375; a steel-faced shield case 38; attaching brackets 42 to 45; and stainless-steel spacers 46, 47 for fixing the cases and for an electric connection. The characteristic of the material of each of casing parts works well.

However, there are problems that assembling ability of the on-vehicle display device is not good due to a substantial number of members to be assembled, weight of the on-vehicle display device is increased by using steel products for strength, and heat radiating ability of the on-vehicle display device is reduced because of a limited heat radiating area.

Accordingly, an object of the present invention is to provide an on-vehicle display device to improve assembling ability by trimming weight of casing parts and by reducing the number of parts while keeping dust resistance, heat radiating ability, and noise tolerability.

Means for Solving Problem

For attaining the object, according to claim 1 of the present invention, there is provided an on-vehicle display device comprising:

an image display unit 6 for displaying graphically various data indicating states of the vehicle;

wiring boards 8, 9 mounting a control circuit for controlling the image display unit 6;

a magnesium alloy case 7 of which front recess receives the image display unit 6, and of which rear recess receives the wiring boards 8, 9;

a shield member 10 attached to the magnesium alloy case 7 so as to cover the rear recess;

a sun shade 3 disposed in front of the front recess receiving the image display unit 6; and a front cover 2 attached to the sun shade 3, wherein the magnesium alloy case 7 is thermally coupled to the image display unit 6 and works as a heat radiating device, and wherein the magnesium alloy case 7 is electrically coupled to the shield member 10 and works as an electromagnetic shield device together with the shield member 10.

For attaining the object, according to claim 2 of the present invention, there is provided the on-vehicle display device as claimed in claim 1, wherein the shield member 10 is thermally coupled to the magnesium alloy case 7 and also works as a heat radiating member.

For attaining the object, according to claim 3 of the present invention, there is provided the on-vehicle display device as claimed in claim 1 or 2, wherein an attaching bracket 7A for attaching the on-vehicle display device to the vehicle is integrally formed with the magnesium alloy case 7.

Incidentally, reference signs in the "means for solving the problem" section correspond to reference signs in the "best mode for carrying out the invention" section below, however, these signs do not limit the scope of the present invention.

Effect of the Invention

According to the invention claimed in claim 1, because a magnesium alloy case, which works as a heat radiating device and an electromagnetic shield device, is used, an on-vehicle display device to improve assembling ability by trimming weight of casing parts and by reducing the number of parts while keeping dust resistance, heat radiating ability, and noise tolerability is attained.

According to the invention claimed in claim 2, because the shield member is thermally coupled to the magnesium alloy case and also works as a heat radiating member, the heat radiating ability is further improved.

According to the invention claimed in claim 3, because an attaching bracket for attaching the on-vehicle display device to the vehicle is integrally formed with the magnesium alloy case, an individual attaching bracket is unnecessary and the number of the assembling parts is reduced, thereby assembling ability is improved.

EXPLANATIONS OF LETTERS OR NUMERALS

Figure 1:
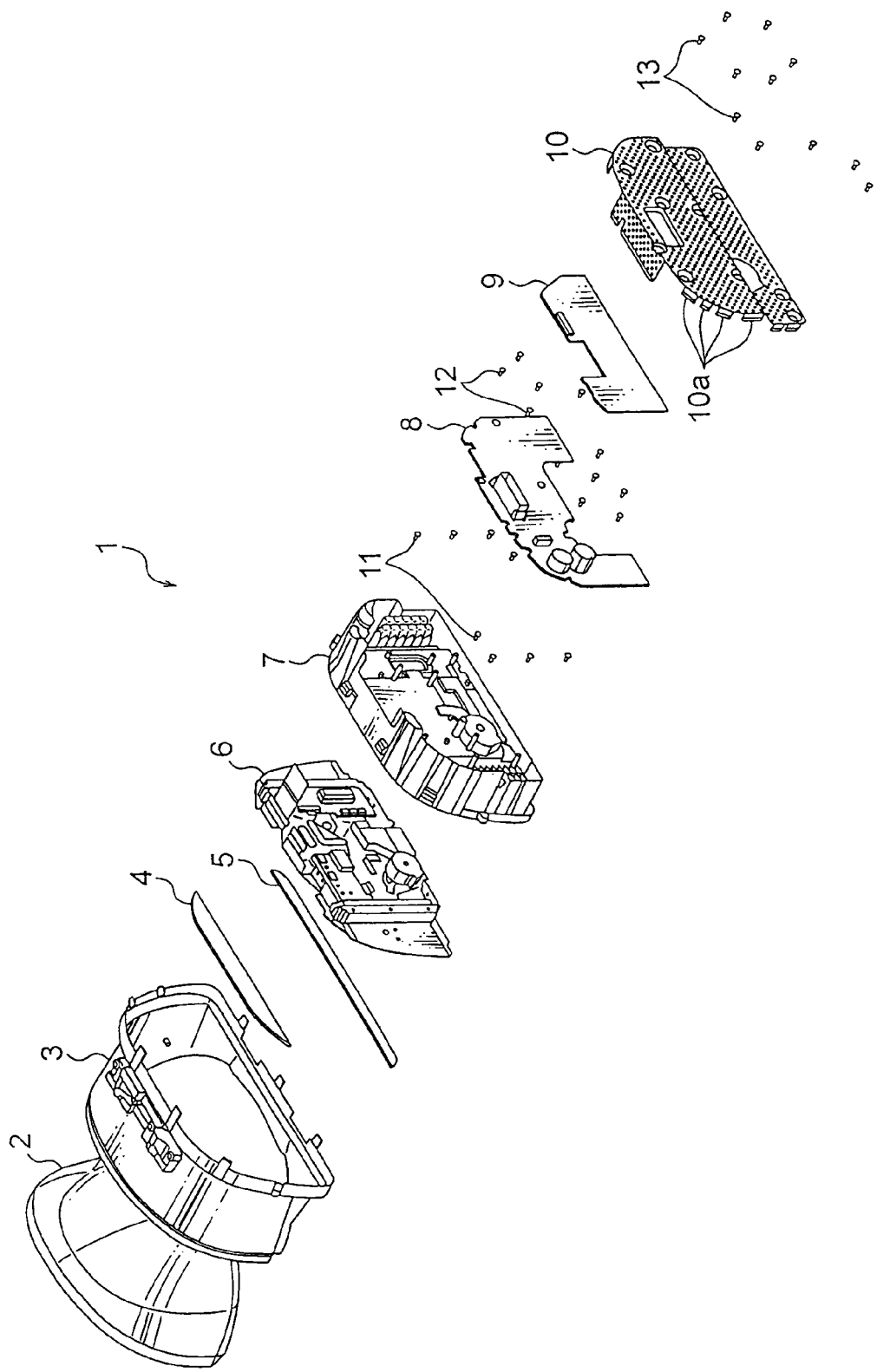
FIG. 1 An exploded perspective view showing an on-vehicle display device according to an embodiment of the present invention.

1 on-vehicle display device
2 front cover
3 sun shade
6 LCD display unit (image display unit)
7 magnesium alloy case
7A bracket attachment
8 circuit board
9 circuit board
10 shield case (shield member)

BEST MODE FOR CARRYING OUT THE INVENTION

Figure 2:
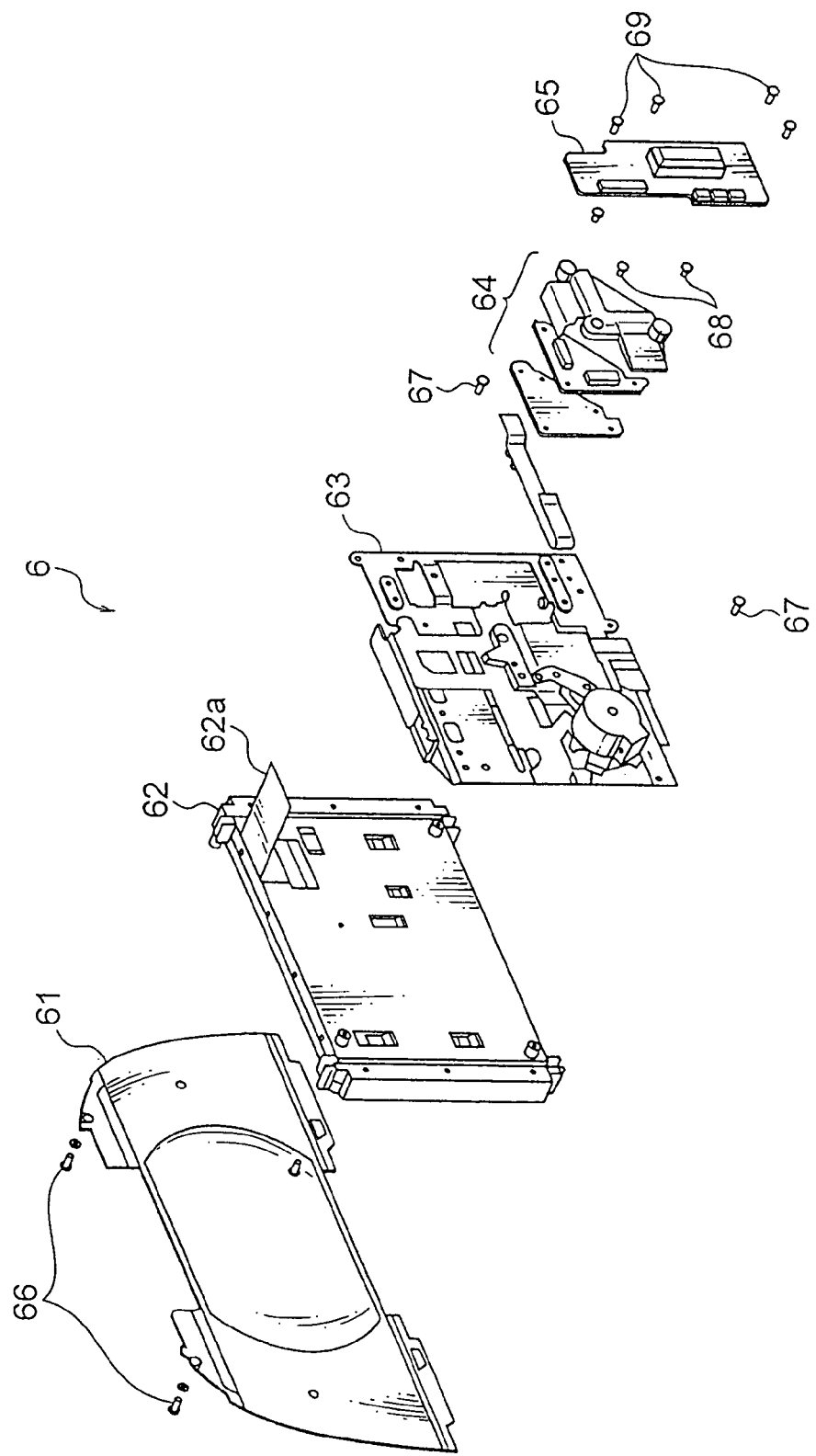
FIG. 2 An exploded perspective view showing an LCD display unit of the on-vehicle display device of FIG. 1.
Figure 3:
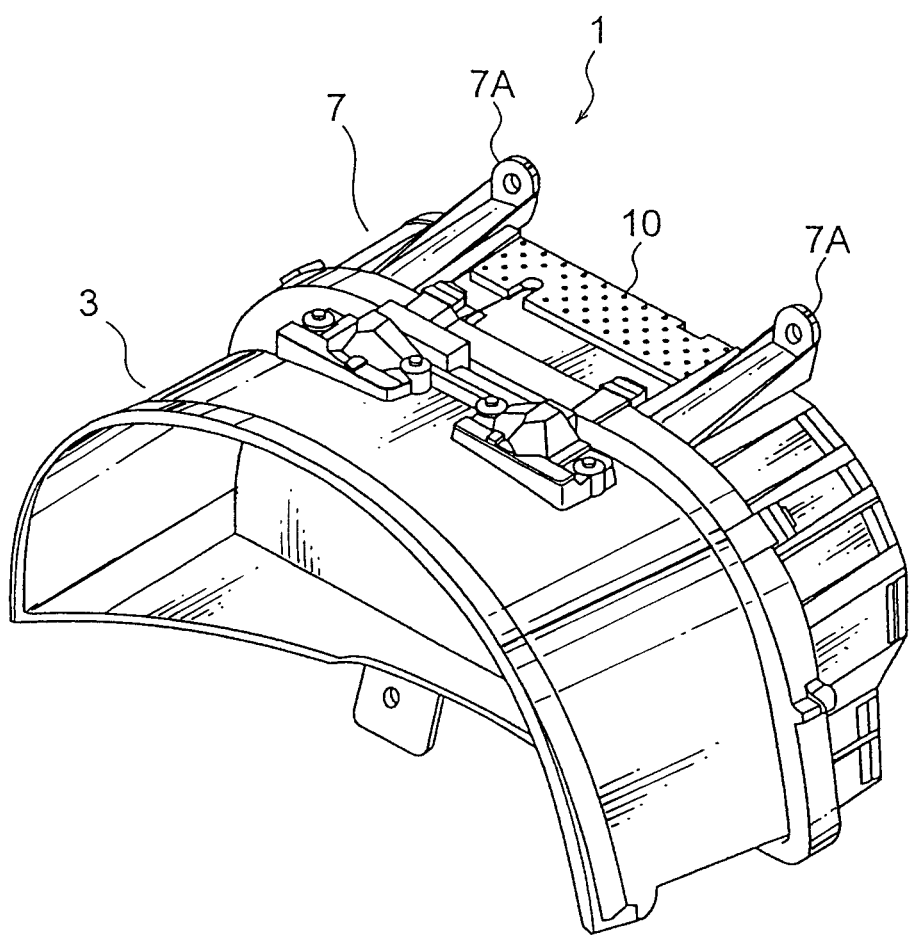
FIG. 3 A perspective view showing an outer appearance of the on-vehicle display device of FIG. 1.
Figure 4:
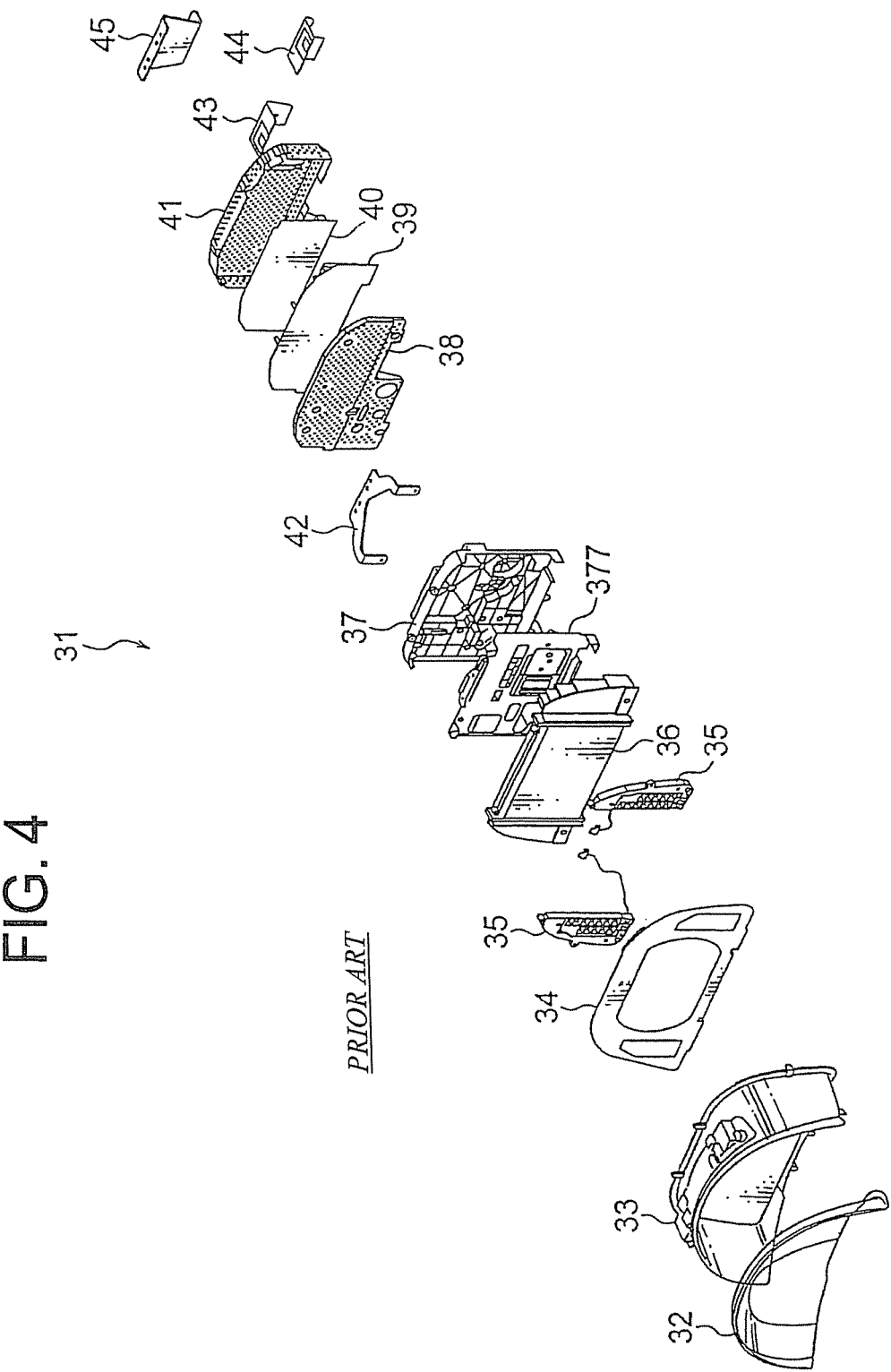
FIG. 4 An exploded perspective view showing an example of an on-vehicle display device having a conventional heat radiating device.

Hereafter, an embodiment of the present invention will be explained with reference to figures. FIG. 1 is an exploded perspective view showing an on-vehicle display device according to the embodiment of the present invention. FIG. 2 is an exploded perspective view showing an LCD display unit of the on-vehicle display device of FIG. 1. FIG. 3 is a perspective view showing an outer appearance of the on-vehicle display device of FIG. 1.

In FIG. 1, the on-vehicle display device 1 includes: a front cover 2; a sun shade 3; bezels 4, 5; an LCD display unit 6; a magnesium alloy case 7; circuit boards 8, 9; and a shield case 10, and is assembled with screws 11 to 13.

Figure 5:
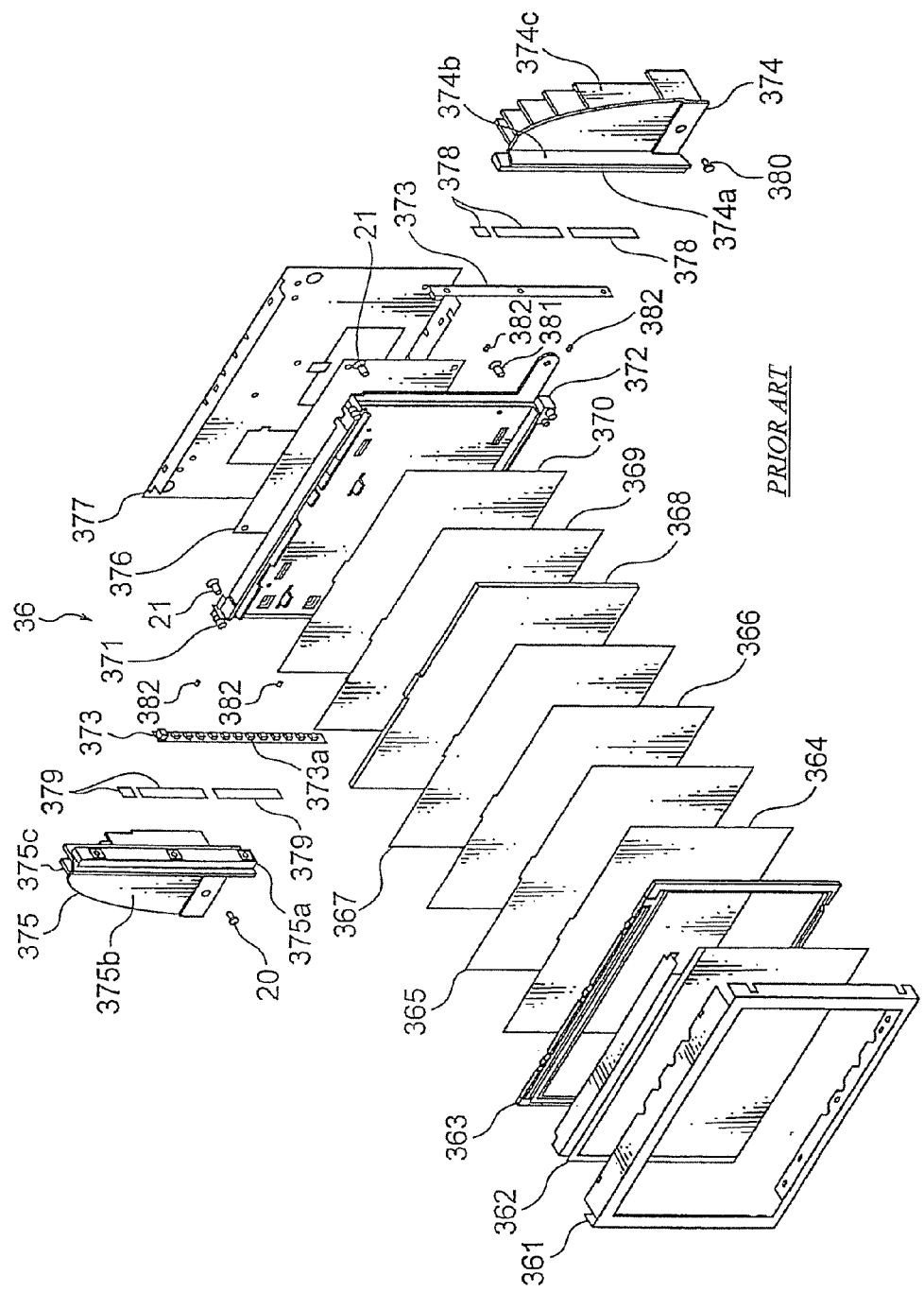
FIG. 5 An exploded perspective view showing an LCD display unit of the on-vehicle display device of FIG. 4.
Figure 6:
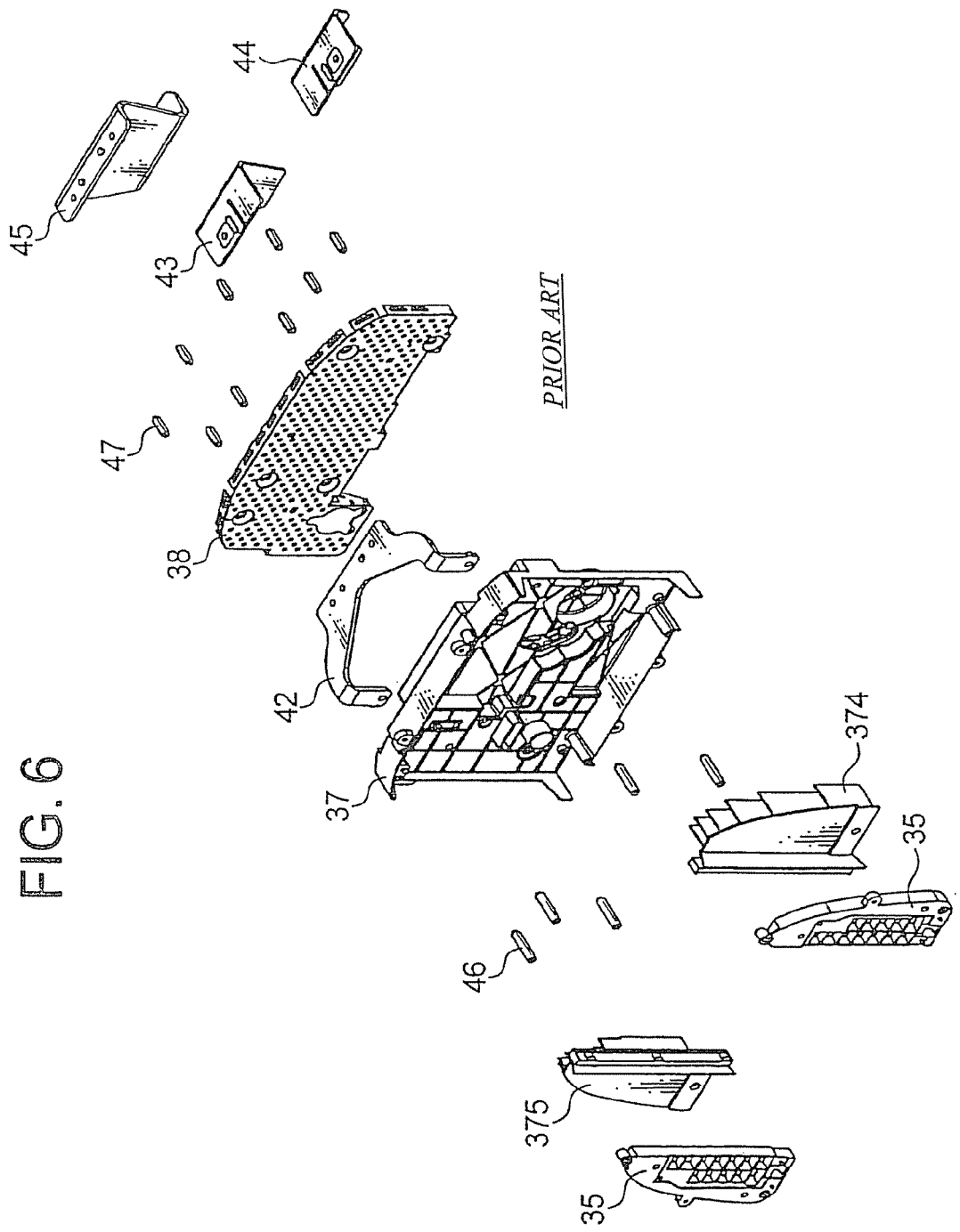
FIG. 6 A partially exploded perspective view showing casing parts of the on-vehicle display device of FIG. 4.

The LCD display unit 6 includes: a front panel 61; an LCD display panel 62; a holder 63; interconnecting parts 64; an interconnecting board 65, and is integrally assembled with screws 66 to 69. A configuration of the LCD display panel 62 is a configuration of the LCD display unit 36 shown in FIG. 5 without heat radiating panels 374, 375, a controlling panel 376, a lower shield case 377, and heat conducting sheets 378, 379. The LCD display panel 62 further includes a flat cable 62a for electrically connecting to the outside. The interconnecting parts 64 connect the interconnecting board 65, and are received in the holder 63 together with the interconnecting board 65. The interconnecting board 65 electrically connects a backlight of the LCD display panel 62.

The circuit board 9 includes a graphic control circuit.

FIG. 3 is a perspective view showing an outer appearance of the fully assembled on-vehicle display device 1.

In this on-vehicle display device 1, the case 7 as a main part of the casing parts is made of magnesium alloy, and integrally formed. The magnesium alloy is lighter and stronger than aluminum, and has enough strength to hold the LCD display unit 6 which is heavier than a typical meter. Further, because the magnesium alloy has good workability, the magnesium alloy can be formed into an on-vehicle meter case having dust resistance. Further, because the magnesium alloy is metallic, the magnesium alloy intrinsically has shield ability. Further, because the whole case is made of metal, the magnesium alloy case also includes heat radiating ability.

By integrating the casing parts with the magnesium alloy having such characteristics, the assembling ability is improved.

Accordingly, a front recess of the magnesium alloy case 7 receives the image display unit 6, and a rear recess of the magnesium alloy case 7 receives the wiring boards 8, 9; and a shield member 10 is attached to the magnesium alloy case 7 for covering the rear recess. Further, the magnesium alloy case 7 is thermally coupled to the image display unit 6 (in detail, the magnesium alloy case 7 contacts the metallic LCD substrate on the sides of the LCD display panel 62) and works as a heat radiating device. Further, an attaching bracket 7A for attaching the on-vehicle display device 1 to the vehicle is integrally formed with the magnesium alloy case 7. Incidentally, in this on-vehicle display device 1, projections 10a are formed on an outer periphery of the shield case 10 for electrically connected to the magnesium alloy case 7 and thermally coupled to the magnesium alloy case 7, and wide ribs are formed on a side wall of the magnesium alloy case 7 for engaging with the projections 10a. Thereby, the shield ability of the on-vehicle display device 1 is improved, and the shield case 10 also has the heat radiating ability.

Thus, according to the present invention, by using the magnesium alloy as a case, the case has enough strength to hold a heavy full graphic meter with an LCD screen, and has good dust resistance, good heat radiating ability and good noise tolerability. Further, the assembling ability of the on-vehicle display device 1 is improved drastically.

Although the present invention has been fully described by way of example with reference to the accompanying drawings, it is to be understood that various changes and modifications will be apparent to those skilled in the art.

For example, in the embodiment described above, the LCD display unit is used as an image display unit. However, the present invention is not limited to this. Other display units such as a plasma display unit can be used.

The invention claimed is:

1. An on-vehicle display device comprising:
   an image display unit for displaying graphically various data indicating states of the vehicle;
   wiring boards mounting a control circuit for controlling the image display unit;
   a magnesium alloy case of which front recess receives the image display unit, and of which rear recess receives the wiring boards;
   a shield member attached to the magnesium alloy case so as to cover the rear recess; and
   a sun shade disposed in front of the front recess receiving the image display unit; and
   a front cover attached to the sun shade,
   wherein the magnesium alloy case is thermally coupled to the image display unit and works as a heat radiating device, and
   wherein the magnesium alloy case is electrically coupled to the shield member and works as an electromagnetic shield device together with the shield member.

2. The on-vehicle display device as claimed in claim 1, wherein the shield member is thermally coupled to the magnesium alloy case and also works as a heat radiating member.

3. The on-vehicle display device as claimed in claim 1, wherein an attaching bracket for attaching the on-vehicle display device to the vehicle is integrally formed with the magnesium alloy case.

4. The on-vehicle display device as claimed in claim 2, wherein an attaching bracket for attaching the on-vehicle display device to the vehicle is integrally formed with the magnesium alloy case.

* * * * *